United States Patent [19]

Andersen

[11] 4,300,877
[45] Nov. 17, 1981

[54] UNDERWATER PELLETIZER

[75] Inventor: Howard W. Andersen, Houston, Tex.

[73] Assignee: Sterling Extruder Corp., South Plainfield, N.J.

[21] Appl. No.: 2,550

[22] Filed: Jan. 10, 1979

[51] Int. Cl.³ .............................................. B29C 17/14
[52] U.S. Cl. ..................................... 425/67; 264/142; 425/311; 425/313; 425/315
[58] Field of Search .................. 425/313, 71, 464, 67, 425/307, 310, 311, 315, 306; 264/142

[56] References Cited

U.S. PATENT DOCUMENTS

| | | | |
|---|---|---|---|
| 2,775,788 | 1/1957 | Andrew | 425/306 |
| 2,918,701 | 12/1959 | Hall et al. | 264/142 |
| 3,029,466 | 4/1962 | Guill | 425/306 |
| 3,214,796 | 11/1965 | Ginaven | 425/306 |
| 3,230,582 | 1/1966 | Hoffman et al. | 425/306 |
| 3,271,821 | 9/1966 | Street | 425/306 |
| 3,287,764 | 11/1966 | Swickard et al. | 425/306 |
| 3,324,510 | 6/1967 | Kleeb | 425/306 |
| 3,337,913 | 8/1967 | List | 425/306 |
| 3,341,892 | 9/1967 | Mayner | 425/313 |
| 3,493,992 | 2/1970 | Garretto et al. | 425/306 |
| 3,521,325 | 7/1970 | Schippers | 425/306 |
| 3,564,650 | 2/1971 | Irving | 425/306 |
| 3,585,684 | 6/1971 | McIntosh et al. | 425/306 |
| 3,608,142 | 9/1971 | Miler | 425/306 |
| 3,749,539 | 7/1973 | Galbreath et al. | 425/313 |
| 3,874,835 | 4/1975 | Rossiter et al. | 425/306 |
| 4,046,497 | 9/1977 | Newman | 425/313 |
| 4,097,212 | 6/1978 | Morishima et al. | 425/313 |
| 4,150,595 | 4/1979 | Loffler et al. | 425/313 |
| 4,187,067 | 2/1980 | Mizuno et al. | 425/313 |

Primary Examiner—Jay H. Woo
Attorney, Agent, or Firm—Pennie & Edmonds

[57] ABSTRACT

A conventional underwater plastic pelletizer of the type using a rotatable knife hub is improved by securing to the knife hub a diverter plate for confining the flow of inlet water to the region adjacent the face of the die plate. The cutting knives are mounted on the rotating hub at a rake angle with respect to the hub center and tilted at an angle with respect to the surface of the die plate so as to effectively pull a cut pellet away from an extruded plastic strand, and the die plate is heated by an organic heat exchange fluid. The result is a substantial reduction in orifices frozen off by cooled polymer.

16 Claims, 8 Drawing Figures

FIG. 1
FIG. 3A
FIG. 3B
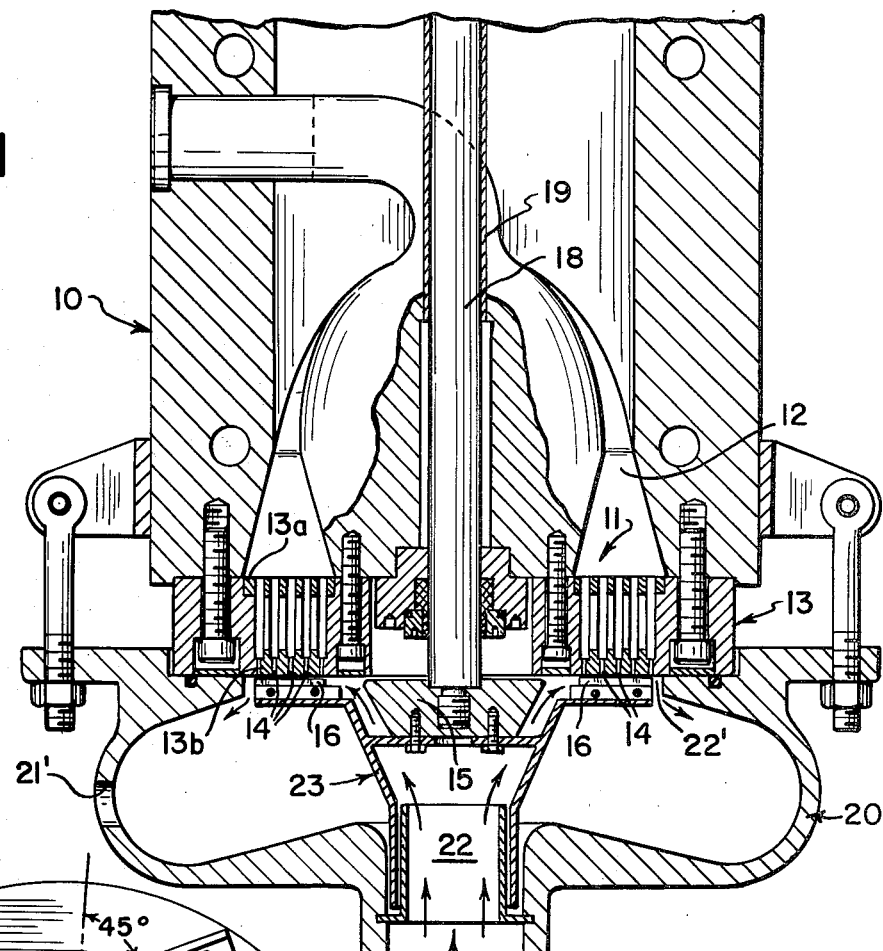
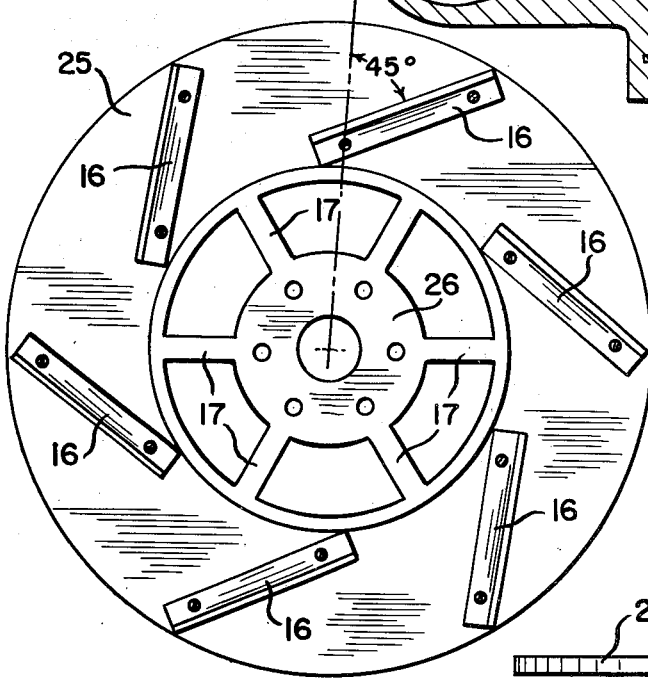
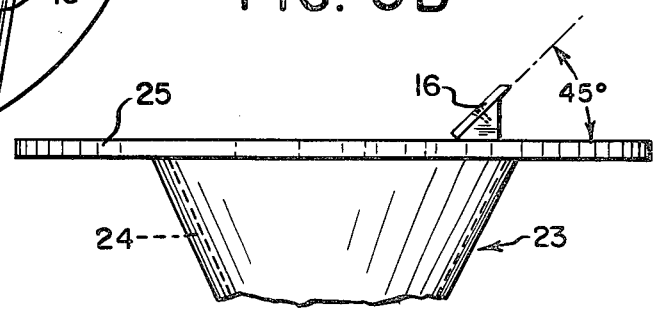

UNDERWATER PELLETIZER

TECHNICAL FIELD

This invention relates to underwater thermoplastic pelletizers and, in particular, to underwater pelletizers having improved means for extruding, cutting and transferring plastic pellets.

BACKGROUND ART

The pelletization of thermoplastic materials is of considerable importance for many applications. Pellets, unlike ingots or bars, readily flow in measuring and dispensing apparatus and the size of pellet charges can be readily controlled to small tolerances. Moreover, unlike powders, they do not form dust and are not ingested by persons working with them. Thus, they provide a highly convenient form for the pacakaging, storage and use of many thermoplastic polymers.

The most advantageous approach for reliably producing pelletized materials at high rates is through the use of underwater pelletizers. A typical underwater pelletizer, such as that shown in U.S. Pat. No. 3,271,821, issued to L. F. Street, comprises a die plate supporting body including an inlet for thermoplastic material, an outlet and an extrusion cavity. A die plate defining a plurality of annularly arranged extrusion orifices is positioned in closing relation to the outlet with the orifices in communication with the cavity. A rotatable knife hub having a plurality of knives secured thereto is positioned for cutting plastic extruded from the orifices into plastic pellets, and a water-tight housing, with water inlet and outlet openings, is secured to the body over the die plate. Means, such as channels for hot fluid, are provided for heating the die plate in order to maintain the plastic in flowing condition as it passes through the orifices.

In operation, hot thermoplastic material is continuously extruded through the orifices of the die plate in the form of hot thermoplastic rods or strands into the water filled housing. As the strands are extruded and while immersed in water, they are cut into short lengths or pellets by the rapidly revolving knives. The resulting pellets are quickly cooled by the water and carried in suspension from the housing to a collection station.

Conventional pelletizers encounter a number of problems. One such problem is that the rapidly rotating hub and cutting knives generate a centrifugal water flow and thereby drive water away from the die plate. The result is vortexing and non-uniform cooling of the heated plate with resulting difficulty in maintaining the heated die plate at the desired uniform temperature at all orifices.

Another problem pertains to a shear and bending movement produced on the extruded strand by the cutting knives. In conventional arrangements, the cutting knives produce a pushing and bending force on the strands while they are being severed. This force can push partially cooled plastic material back into an orifice on the far side of a cut.

Yet, a third problem pertains to the heating of the die plate. In typical heating arrangements hot oil or superheated steam is passed through heating channels in the die plate. In such arrangements there is a substantial temperature differential between the input and output ends of the heating channels with the consequence that orifices near the output ends are much more likely to be blocked or "frozen off" by polymer solidified by the water. Furthermore, the use of steam at high temperatures presents the problem of generating and transmitting high temperature gas at very high pressures. High pressure boilers, couplings and piping are required. Accordingly, there is a need for an improved underwater pelletizer.

DISCLOSURE OF INVENTION

In accordance with the invention, a conventional underwater plastic pelletizer of the type using a rotatable knife hub is improved by securing to the knife hub a diverter plate for confining the flow of inlet water to the region adjacent the face of the die plate. The cutting knives are mounted on the rotating hub at a rake angle with respect to the hub center and tilted at an angle with respect to the surface of the die plate so as to effectively pull a cut pellet away from an extruded plastic strand, and the die plate is heated by an organic heat exchange fluid. The result is a substantial reduction in orifices frozen off by cooled polymer.

BRIEF DESCRIPTION OF THE DRAWINGS

The nature, advantages and various features of the invention will appear more fully upon consideration of the illustrative embodiments now to be described in detail in connection with the accompanying drawings.

In the drawings:

FIG. 1 is a vertical section through an improved underwater pelletizer in accordance with the invention;

FIGS. 3A and 3B are schematic plan and cross sectional views showing the orientation of the cutting knives in the embodiment of FIG. 1 and their relationship to the diverter plate;

For convenience of reference, the same structural elements are given the same reference numerals throughout the drawings.

BEST MODE FOR CARRYING OUT THE INVENTION

Figure 2:
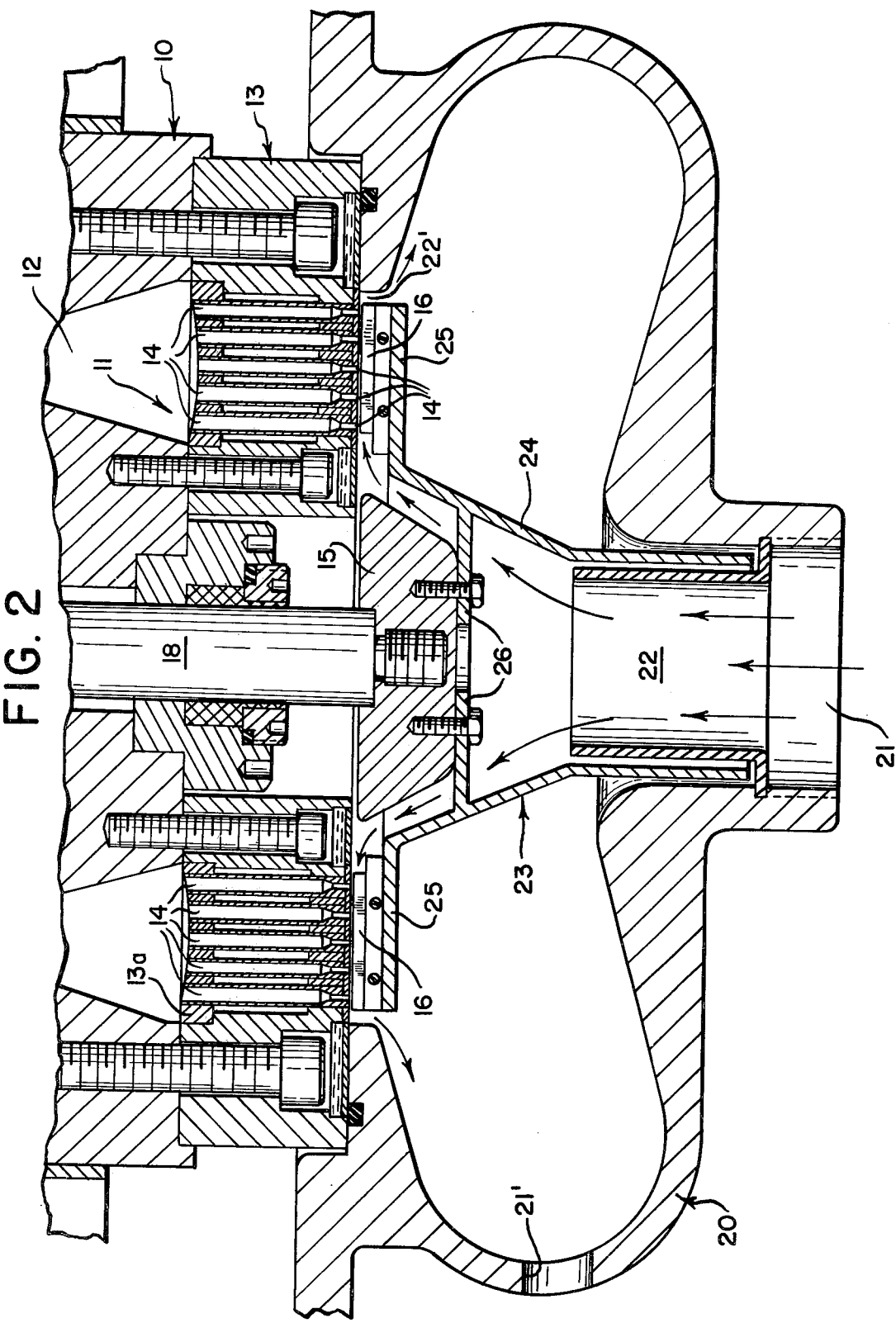
FIG. 2 is an enlarged view of a portion of FIG. 1 illustrating in greater detail the diverter plate secured to the knife hub.

Referring to the drawings, FIG. 1 illustrates an improved underwater pelletizer employing a diverter plate, cutting knife orientation, and heating arrangement in accordance with the invention. The pelletizer comprises, in substance, a die plate supporting body 10 including an inlet for thermoplastic material (not shown), an outlet end 11, and an extrusion cavity 12. A die plate 13 defining a plurality of annularly arranged extrusion orifices 14 is positioned in closing relation to outlet 11 with the orifices in communication with cavity 12. Channels (14' of FIG. 4B) are provided for permitting the circulation of hot fluid around the walls of orifices 14.

A rotatable knife hub 15 having a plurality of knives 16 secured thereto is positioned for cutting plastic (not shown) extruded from orifices 14. The knife hub and knives are conveniently rotated by a drive shaft 18 extending through die plate 13 and sleeve 19 in body 10 to a drive motor (not shown) and supported by suitable bearings.

A water-tight housing 20, with water inlet 21 and outlet 21' is secured to the body 10 over the die plate 13. As best shown in FIG. 2, which is an enlarged view of the lower end portion of FIG. 1, a diverter plate 23, having an inverted funnel-shaped guide wall 24 with a transverse flanged portion 25, is secured to knife hub 15 by a spoked homogenizing wheel 26. As shown in FIG. 3A, the inner ends of the spokes of the wheel are attached to the hub while the outer ends are attached to the diverted plate. The enlarged end of the diverter plate is positioned over the knife hub in spaced relation thereto and the flange 25 is disposed in spaced parallel relation with the die plate. The diverter plate is positioned to receive substantially all of the inflowing water from its inlet end 22 and to confine it to the region within housing 20 adjacent the face of die plate 13 as it issues from its outlet end 22'.

As best shown in FIGS. 3A and 3B, knives 16 are advantageously secured to flange 25 of the diverter plate. In operation, the diverter plate, including the spoked homogenizer 17, is rotated by hub 15 (of FIG. 1). Water flowing through the inlet passes through the spokes of the rotating homogenizer and then flows across the face of die plate 13, cooling the extruded strands and carrying cut pellets in suspension to the outlet. The pellets are subsequently separated from the water, as by a centrifugal separator (not shown).

The advantages accruing from the use of this diverter plate are manyfold. The diverter plate provides for a more uniform distribution of water across the die face and more uniform and controllable colling. It, thus, reduces freeze off and steam formation on the die plate. It also produces enhanced cooling of the cutting blades, prolonging useful blade life; and the relatively high flow rate of water passing in the narrow path between the diverter and the die face reduces the tendency of pellets to agglomerate.

As shown in FIGS. 3A and 3B, the knives 16 are mounted on flange 25 at a rake angle with respect to a radial line from the hub center and tilted at an angle with respect to the face of die plate 13 so as to effectively pull a cut pellet away from an extruded plastic strand. This requires that the rake and tilt angles be so chosen that the net resultant force applied by the cutting blade is away from the die plate. Preferably, both angles are approximately 45°, although variations of plus or minus 5° in either angle do not alter the principle of operation.

In operation, as the hub rotates, it drives the diverter plate and the knives 16 around the face of the die plate 13, cutting off strands of extruded plastic. Because of the properly selected rake and tilt angles, the cut pellets are pulled from the strands with reduced shear and bending movement and a consequent reduction in the tendency of the plastic to freeze off in the orifices.

Figure 4A:
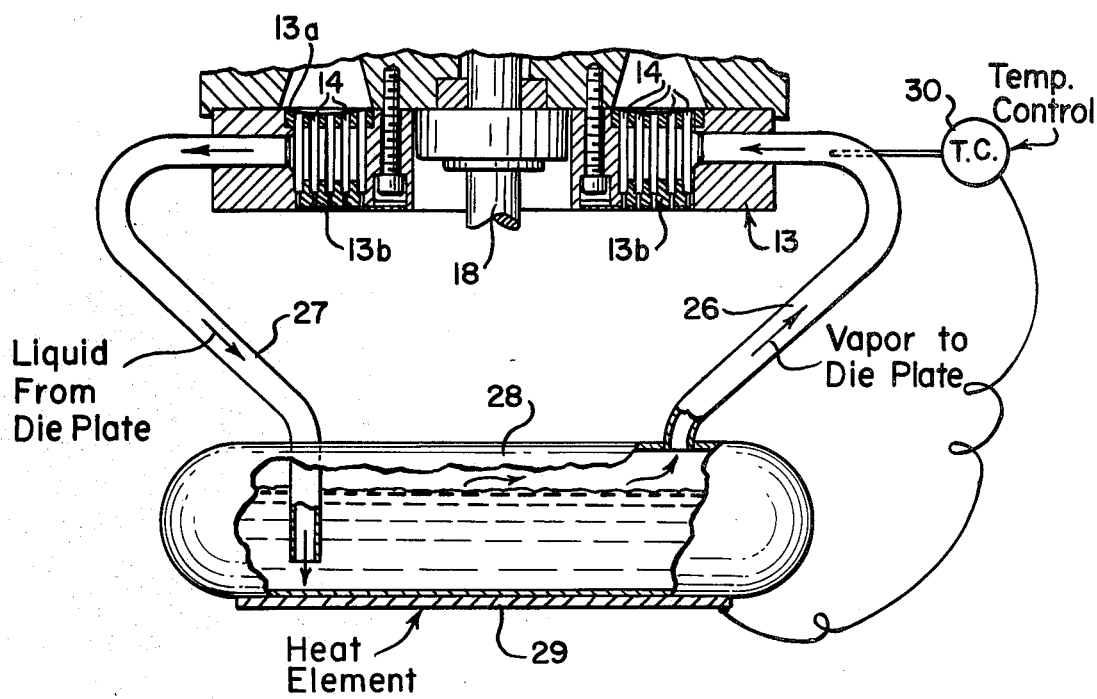
FIGS. 4A and 4B are schematic views of the arrangement for heating the die plate in the embodiment of FIG. 1.
Figure 4B:
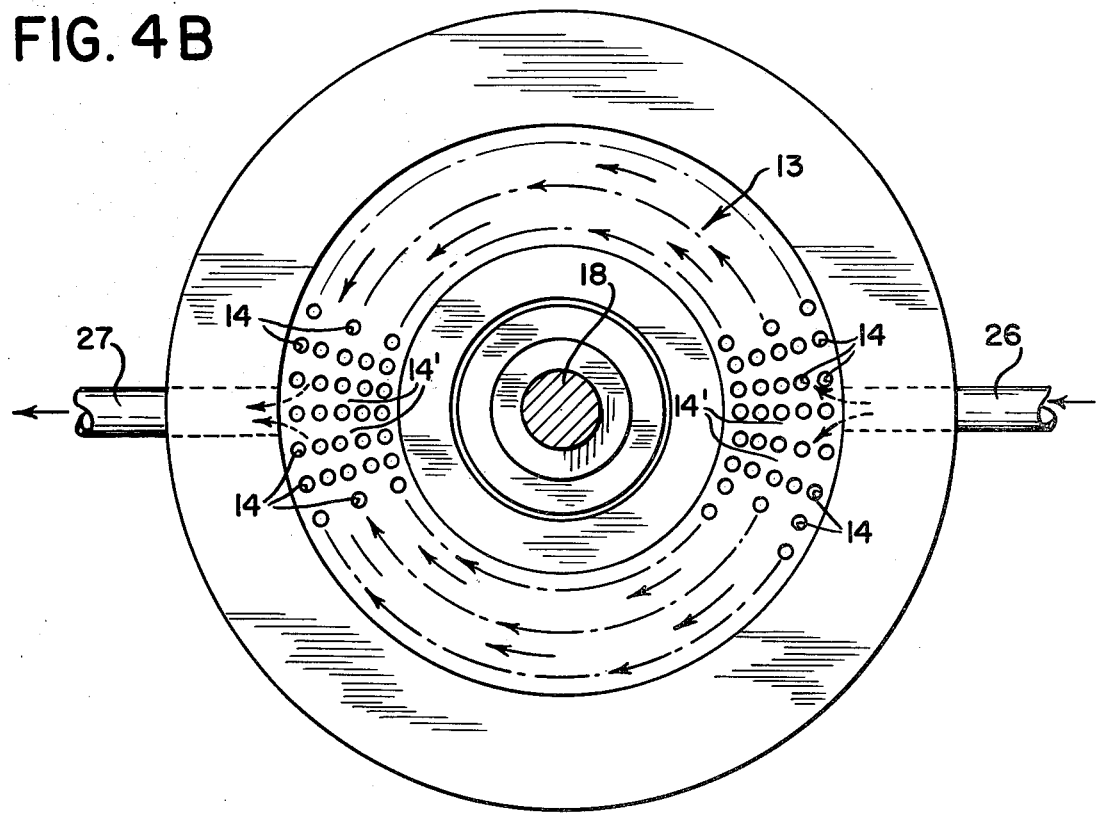

FIGS. 4A and 4B illustrate a preferred arrangement for heating the die plate with organic heat exchange medium in accordance with the invention. As illustrated, the die plate is maintained in a substantially horizontal position with channels or open spaces within the plate between walled orifices 14. An organic heat exchange medium such as Dowtherm A, marketed by the Dow Chemical Co., enters the die plate channels in the vapor phase through inlet tube 26 and circulates throughout the plate. Wherever the temperature of an orifice wall drops below the evaporation temperature of the medium, the vapor liquefies, releasing heat in a controllable amount to heat up the wall. The resulting liquid passes from the die plate through outlet conduit 27 into reservoir 28. A heating element 29 at the reservoir is conveniently controlled by a temperature sensor 30 to control the temperature of the medium at the inlet to the die plate.

There are several significant advantages to this heating arrangement. For example, it provides for substantially uniform heating of all orifice walls and is not affected by cooling of the die plate. It eliminates the necessity for complex channeling, and, using flash vaporization of the organic medium for circulation, requires no pumps. Moreover, as compared to steam, the organic heat exchange medium operates at much lower pressures at comparable temperatures. For example, at 550° F., Dowtherm A operates at a pressure of about 27 psia. At the same temperature, steam would operate at a pressure of about 1000 psia. Thus, this heating arrangement also eliminates the necessity for high pressure boilers, couplings and piping.

Figure 5:
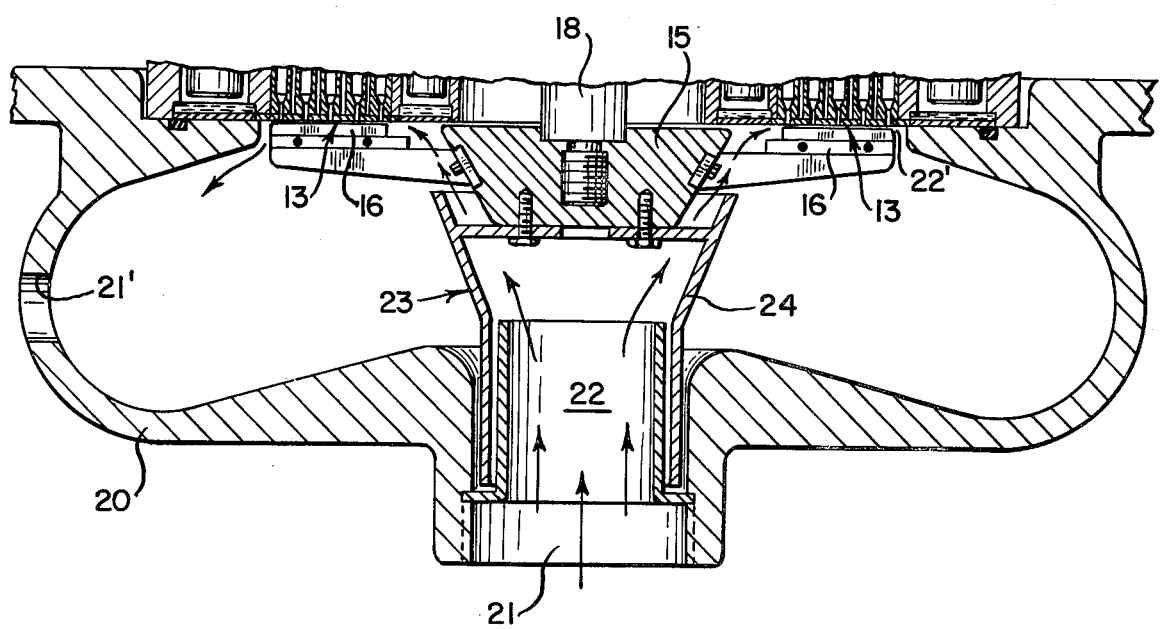
FIGS. 5 and 6 illustrate alternative forms of diverter plates in accordance with the invention.

FIG. 5 illustrates an alternative form of a diverter plate 23 in accordance with the invention comprising simply inverse funnel-shaped guide walls 24 secured to a conventional knife hub 15. This embodiment differs from that of FIG. 1 in that the transverse flange portion 25 has been omitted and the knives 16 are secured directly to the hub in the usual manner.

In operation, as shown by the arrows in FIG. 5, water flowing through the inlet is guided by walls 24 onto the face of die plate 13.

Figure 6:
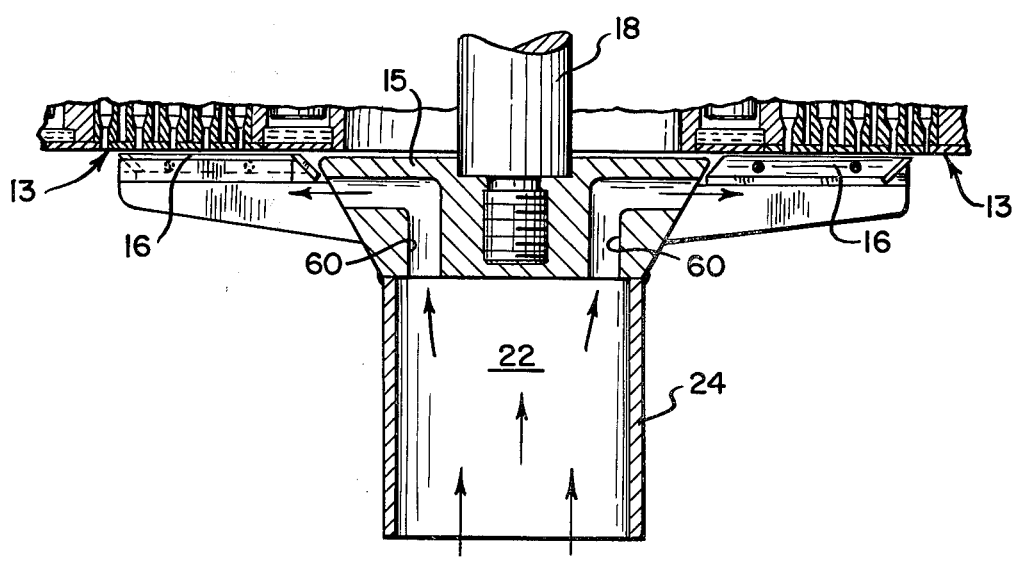

FIG. 6 illustrates yet another alternative diverter plate comprising substantially cylindrical guide walls 24 affixed to a knife hub 15 containing flow directing passages 60 to direct inflowing water onto the face of die plate in a direction substantially parallel to the face.

It should be clear that the preferred knife orientations and heating arrangements described in connection with the diverter plate of FIGS. 1–4 can equally well be used with the diverter plates of FIGS. 5 and 6.

While the invention has been described in connection with a small number of specific embodiments, it is to be understood that these are merely illustrative of the many other specific embodiments which can also utilize the principles of the invention. Thus, numerous and varied devices can be made by those skilled in the art without departing from the spirit and scope of the invention.

I claim:

1. In an underwater plastic pelletizer of the type comprising a die plate supporting body including an inlet, an outlet and an extrusion cavity; a die plate on said body positioned in closing relation to said outlet defining a plurality of extrusion orifices arranged annularly thereon in communication with said cavity; rotatable cutting means comprising a rotating knife hub and a plurality of rotating knives mounted for rotation therewith for cutting plastic extruded from said orifices into plastic pellets; a water-tight housing secured to said body over said die plate having water inlet means and outlet means for permitting removal of cut plastic pellets by moving water; and means for heating said die plate to maintain plastic in a flowing condition as it passes through said orifices, the improvement comprising:

(a) a diverter plate having an inlet end in communication with said water inlet means and an outlet end disposed about said knife hub, said diverter plate including a peripheral flange disposed in a plane extending parallel to and spaced uniformly from said die plate, said peripheral flange dimensioned so as to completely overlie said plurality of extrusion orifices for confining the flow of inlet water generally uniformly to the region adjacent to and across the face of the die plate and in a direction generally parallel thereto.

2. A pelletizer according to claim 1 wherein:
(a) said diverter plate comprises:
(1) a funnel-shaped member having its enlarged end defining the outlet end thereof and disposed over said knife hub in spaced relation thereto, and
(2) said peripheral flange being attached to said enlarged end.

3. A pelletizer according to claim 2 further including:
(a) means for securing said diverter plate to said knife hub for rotation therewith.

4. A pelletizer according to claim 3 wherein:
(a) said cutting knives are mounted on the flange of the diverter plate.

5. A pelletizer according to claim 4 wherein:
(a) the means for securing the diverter plate to the knife hub includes a radially spoked wheel having the inner ends of the spokes fixed to said hub and the outer ends thereof fixed to said plate, said wheel being in the path of flow between the inlet and outlet ends of the diverter plate.

6. A pelletizer according to claim 4 wherein:
(a) said cutting knives are mounted on said flange at a rake angle with respect to a radial line from the hub center and tilted at a tilt angle with respect to the surface of the die plate, so as to effectively pull a cut pellet away from an extruded plastic strand.

7. A pelletizer according to claim 6 wherein:
(a) said rake and tilt angles are each about 45°.

8. A pelletizer according to claim 6 wherein:
(a) said means for heating said die plate includes an organic heat exchange medium.

9. A pelletizer according to claim 8 wherein said means for heating said die plate further includes:
(a) a closed conduit circuit having:
(1) an inlet pipe connected to the interior of the die plate for carrying the organic heat exchange medium in the vapor phase to and through said die plate, and
(2) an outlet pipe connected to the interior of the die plate for carrying the organic heat exchange medium in the liquid phase from the die plate; and
(b) heating means in said circuit external of the die plate for heating the liquid phase of the heat exchange medium to its vapor phase.

10. A pelletizer according to claim 1 wherein:
(a) said cutting knives are mounted on said rotating hub assembly at a rake angle with respect to a radial line from the hub center and tilted at a tilt angle with respect to the surface of the die plate, so as to effectively pull a cut pellet away from an extruded plastic strand.

11. A pelletizer according to claim 10 wherein:
(a) said rake angle is approximately 45°.

12. A pelletizer according to claim 10 wherein:
(a) said tilt angle is approximately 45°.

13. A pelletizer according to claim 10 wherein:
(a) said rake angle and said tilt angle are each about 45°.

14. In an underwater plastic pelletizer of the type comprising a die plate supporting body including an inlet, an outlet and an extrusion cavity; a die plate on said body positioned in closing relation to said outlet defining a plurality of extrusion orifices arranged annularly thereon in communication with said cavity; rotatable cutting means comprising a rotating knife hub and a plurality of rotating knives mounted for rotation therewith for cutting plastic extruded from said orifices into plastic pellets; a water-tight housing secured to said body over said die plate having water inlet means and outlet means for permitting removal of cut plastic pellets by moving water; and means for heating said die plate to maintain plastic in a flowing condition as it passes through said orifices, the improvement wherein:
(a) said means for heating said die plate comprises an organic heat exchange fluid medium.

15. A pelletizer according to claim 14 wherein said means for heating said die plate further includes:
(a) a closed conduit circuit having:
(1) an inlet pipe connected to the interior of the die plate for carrying the organic heat exchange medium in the vapor phase to and through said die plate, and
(2) an outlet pipe connected to the interior of the die plate for carrying the organic heat exchange medium in the liquid phase from the die plate; and
(b) heating means in said circuit external of the die plate for heating the liquid phase of the heat exchange medium to its vapor phase.

16. In an underwater plastic pelletizer of the type comprising a die plate supporting body including an inlet, an outlet and an extrusion cavity; a generally horizontally disposed die plate on said body positioned in closing relation to said outlet defining a plurality of extrusion orifices arranged annularly thereon in communication with said cavity; rotatable cutting means comprising a rotating knife hub and a plurality of rotating knives mounted for rotation therewith for cutting plastic extruded from said orifices into plastic pellets; a water-tight housing secured to said body over said die plate having water inlet means and outlet means for permitting removal of cut plastic pellets by moving water; and means for heating said die plate to maintain plastic in a flowing condition as it passes through said orifices, the improvement comprising:
(a) a generally horizontally disposed diverter plate having an inlet end sealingly in communication with said water inlet means and an outlet end disposed centrally of said diverter plate and about said knife hub, said diverter plate including a peripheral flange disposed in a plane extending parallel to and spaced uniformly from said die plate, said peripheral flange dimensioned so as to completely overlie said plurality of extrusion orifices for confining the flow of inlet water generally uniformly to the region adjacent to and across the face of the die plate and in a direction generally parallel thereto.

* * * * *